July 1, 1930.  C. A. VAN DUSEN  1,769,005
AIRPLANE WING STRUCTURE
Filed July 29, 1927   4 Sheets-Sheet 1

INVENTOR
Charles A. Van Dusen
BY
Kwis, Hudson & Kent
ATTORNEYS

July 1, 1930.  C. A. VAN DUSEN  1,769,005
AIRPLANE WING STRUCTURE
Filed July 29, 1927    4 Sheets-Sheet 2

INVENTOR
Charles A. Van Dusen
BY
Kwis, Hudson & Kent
ATTORNEYS

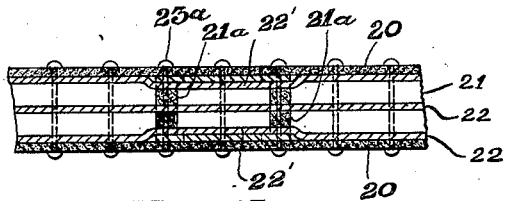
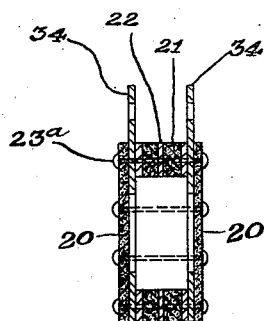
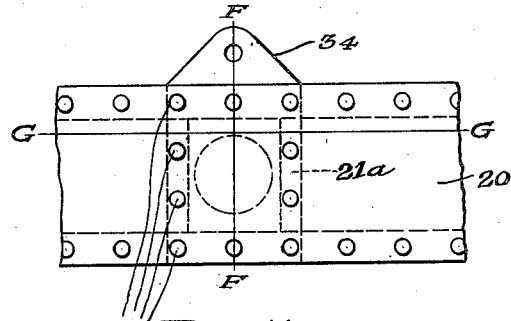
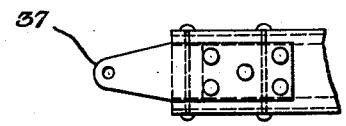
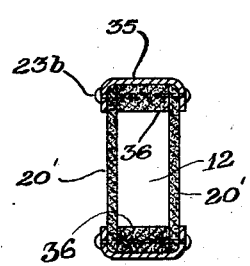
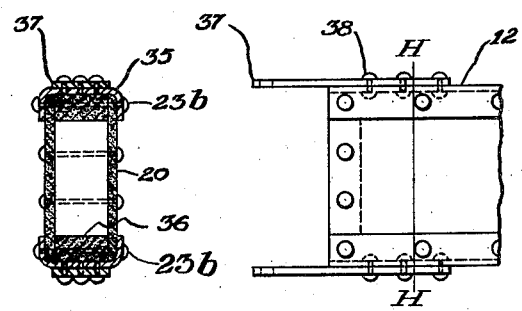
INVENTOR
Charles A. Van Dusen
BY
Kwis, Hudson & Kent
ATTORNEYS

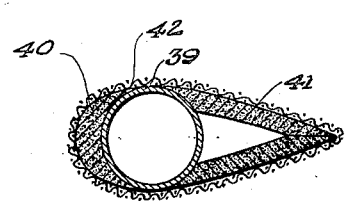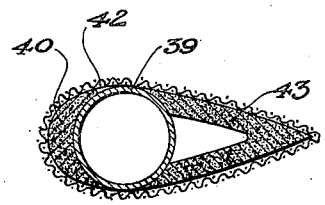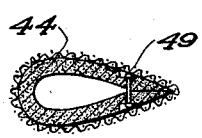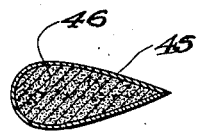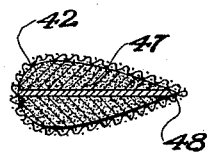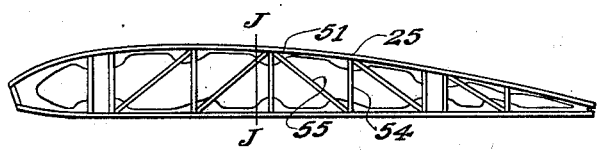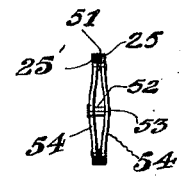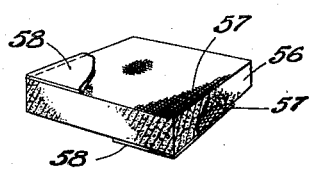

Patented July 1, 1930

1,769,005

UNITED STATES PATENT OFFICE

CHARLES A. VAN DUSEN, OF CLEVELAND, OHIO, ASSIGNOR TO THE GLENN L. MARTIN COMPANY, OF CLEVELAND, OHIO, A CORPORATION OF OHIO

AIRPLANE-WING STRUCTURE

Application filed July 29, 1927. Serial No. 209,238.

This invention relates to airplanes, and has reference particularly to wing structures including interwing struts.

One of the objects of the invention is the utilization, in structures of the kind mentioned, of a non-metallic material having a high strength-weight ratio and possessing the advantage of being non-corrosive.

Other objects, and objects relating to details of construction and economies of manufacture will appear as I proceed with the description of that embodiment of the invention which, for the purposes of the present application, I have illustrated in the accompanying drawings, in which Figure 1 is a perspective view of a biplane wing panel embodying my invention.

Figure 11 is a detail elevational view of a portion of one of the wing beams of Figure 1, showing a strut fitting.

Figures 12 and 13 are vertical and horizontal sections taken on the lines F—F and G—G, respectively, of Figure 11.

Figure 14 is a transverse section through one of the wing beams of Figure 2.

Figure 15 is a fragmental elevational view of an end of one of the beams of Figure 2, showing the wing fittings.

Figure 16 is a transverse section on the line H—H of Figure 15.

Figure 17 is a plan view of the structure of Figure 15.

Figure 1:
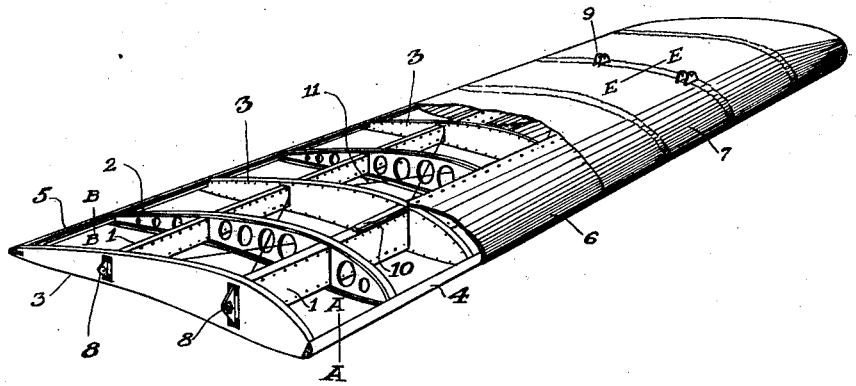

Figures 18 to 22 inclusive are transverse sectional views of various forms of interwing struts.

Figure 23 is an enlarged sectional view of a fragment of metal coated with vulcanized rubber as a protection against corrosive action, this being a preferred treatment for all metal parts employed in the construction.

Figure 24 is a perspective view of a section of reinforced cellular hard rubber, which forms the preferred material employed in the major portion of the wing structure of my invention.

Figure 25 is a side elevation of a modified form of wing rib in which a truss construction is employed.

Figure 26 is a transverse section taken substantially on the line J—J of Figure 25.

Similar reference characters refer to like parts throughout the views.

Figure 2:
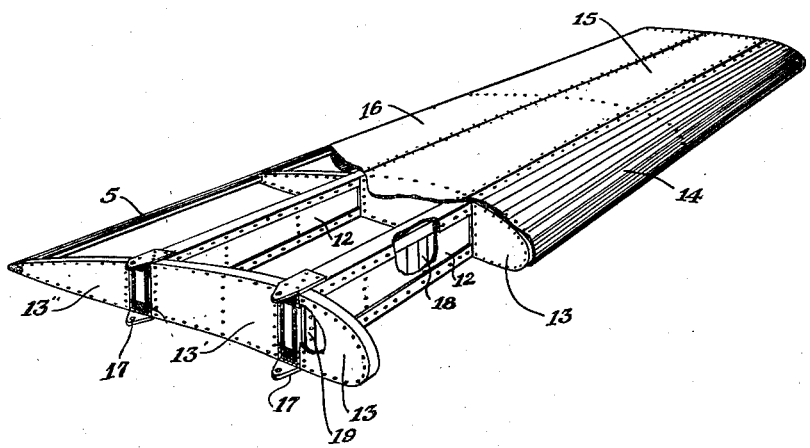
Figure 2 is a perspective view of a cantilever monoplane wing panel embodying the invention in a somewhat different form.

In Figures 1 and 2 of the drawings I have illustrated two somewhat different wing panels, in both of which, however, the chief material entering into the construction is a non-metallic, non-corrosive light weight web material the surfaces of which are reinforced to impart beam characteristics to the composite sheet, that is impervious to moisture, and which may be formed into fairly sharp curves after the application of heat thereto. A structural material which answers these requirements in a highly satisfactory manner, and the only one of that character with which I am at present familiar, is my reinforced cellular hard rubber structural material. This material is the subject of my two copending applications, Serial No. 108,279, filed May 11, 1926, and Serial No. 219,875, filed Sept. 16, 1927, which is a continuation of Serial No. 108,279 to which reference should be had for a detailed description of the same. However, in Figure 24 I have shown a small section of this material, where the cellular hard rubber is indicated at 56. On both surfaces of the material there is secured a sheet of flexible reinforcing material, here illustrated as fabric 57, although other flexible reinforcing materials, such for instance as sheet metal are employed. The outside of the reinforcement on at least one surface of the material, and in any event upon all surfaces which may be subjected to wear or corrosion, I coat with non-porous vulcanized rubber indicated at 58.

In Figure 1 the wing beams are marked 1. In this figure there are a series of open ribs 2 alternating with closed or box ribs 3. The leading edge piece of the panel is indicated generally at 4 and the trailing edge piece at 5. 6 is a nose cover composed preferably of my reinforced cellular rubber structural material in sheet form, which has been bent or formed over the ribs 2 and 3 and the edge piece 4. A portion of the wing cover which may be composed of cotton or linen fabric is shown at 7. On the inner ends of the wing beams 1 are fittings 8 which will be further described hereinafter. Fittings for the interwing struts, shown at 9, will also be referred to more particularly later. On the beams 1, between each pair of adjacent ribs, are filler strips 10, which come flush with the tops of the ribs 2 and 3, and to which the nose cover 6 may be attached by suitable fastenings. Tie rods for bracing the frame structure of the wing are shown at 11.

In Figure 2 the ribs are formed in sections 13, 13′ and 13″, which are separated from each other by the beams 12. The nose of the panel is covered by a sheet of my reinforced cellular rubber structural material 14, similar to the sheet 6 in Figure 1, but in this modification the balance of the panel is also covered with the same material as shown at 15 and 16, except that 15 may be of slightly greater gauge than 14, while 16 may be of smaller gauge than 14. Fittings 17 are attached to the inner ends of the beams 12. The latter are reinforced at intervals by stiffening blocks 18. 19 are strips or blocks secured to the beams 12, and over these blocks the rib sections are placed and secured thereto by proper fastenings.

The detail construction of the parts will now be described. The wing beam 1 is shown in cross section in Figure 3, where the sides or web members of the beam are strips 20, preferably of my reinforced cellular rubber structural material. There are cap strips 21 of the same material with reinforcing strips 22 of metal and rivets 23 to hold the parts in position.

Figure 4:
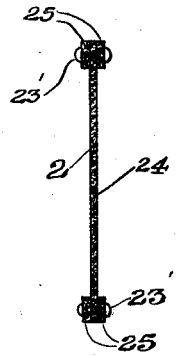

In Figure 4 one of the open ribs 2 is illustrated in section, 24 being a strip of my reinforced cellular rubber structural material which may be provided with lightening holes to save weight, and 25 being cap strips of the same material secured along the edges of the strip 24 by rivets 23′ or the like.

Figure 5:
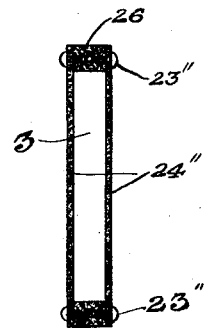
Figure 5 is a cross section of a closed rib or box rib used in Figure 1 and also in Figure 2.

Figure 5 shows a box rib in section, corresponding with the ribs 3 of Figure 1 and with the sectional ribs 13, 13′ and 13″ of Figure 2. Here there are a pair of side strips or web members 24′ spaced apart at the top and bottom by cap strips 26, with rivets 23″ to hold the parts together.

Figure 6:
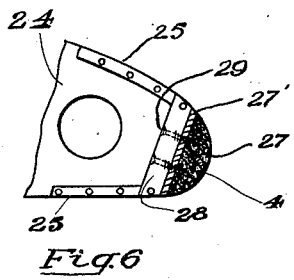

In Figure 6 where the leading edge of the panel of Figure 1 is illustrated, 28 is a continuation of the cap strips 25, although it may be somewhat thicker than those strips. One of these blocks or strips 28 is mounted on each side of the web 24 of the rib, and through the blocks 28, screws 29 are driven extending through openings in a metal reinforcing plate 27′ and into a cellular rubber bar 27.

Figure 7:
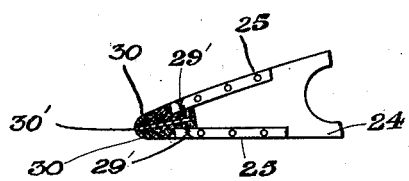
Figures 6 and 7 are cross sections taken on the lines A—A and B—B, respectively, of Figure 1, illustrating in Figure 6 the leading edge and in Figure 7 the trailing edge of the wing.

In Figure 7 the trailing edge of the wing is illustrated. Here the web 24 is notched back to form a dovetail socket into which extends a similarly formed portion of a pair of cellular rubber members 30, reinforced by metallic strips 30′, this edge piece being held in place by screws 29′ extending through the cap strips 25.

Figure 3:
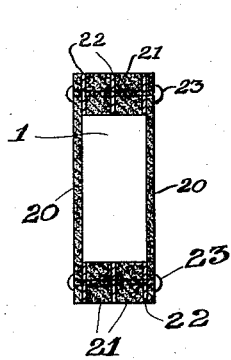
Figures 3 and 4 are cross sections through the wing beam and open wing rib, respectively, of Figure 1.
Figure 10:
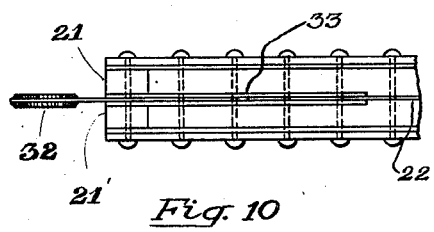
Figure 10 is a plan view of the construction shown in Figure 8.
Figure 9:
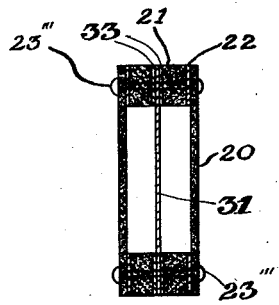
Figure 9 is a cross section taken substantially on the line C—C of Figure 8.
Figure 8:
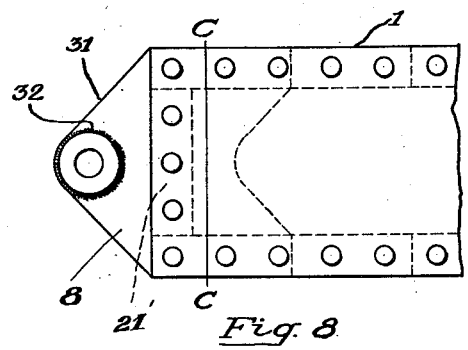
Figure 8 is a fragmental elevational view of the inner end of one of the wing beams of Figure 1, illustrating a wing fitting which may be conveniently employed.

In Figures 8, 9, and 10 I have illustrated a form of wing fitting which I may employ in connection with wing beams like those shown in Figures 1 and 3. When a fitting of this kind is to be attached to the end of the beam the central reinforcing strip 22 is terminated short of the end of the beam. The fitting 31 is then pushed into the space thus provided. Splice plates 33 are then positioned, as shown in Figures 9 and 10, and the rivets 23‴ are set, leaving the end of the fitting with its reinforced eye 32 projecting from the end of the beam. The end openings in the beam may then be filled with blocks 21′ if desired.

In Figures 11, 12 and 13 I have shown means for mounting fittings for interwing struts. The fittings are shown applied to a beam of the kind illustrated in Figures 1 and 3. In order to prepare the beam for the reception of the fittings, the metal reinforcing strips 22 are off-set inwardly, as shown at 22′, Figure 13. The fittings 34 are then slid down into place in the spaces thus provided, and rivets 23$^a$ are employed to hold the parts together, spacing blocks 21$^a$ being interposed between the two off-sets 22′ intermediate the cap strips at the top and bottom of the beam to take the compressive force of the rivets.

In Figure 14 one of the beams 12 of Figure 2 is shown in section. Here we have web members 20′ spaced top and bottom by cap strips 36, while metallic channel shaped reinforcing strips 35 straddle the top and bottom edges of the beam and are secured thereto by rivets 23$^b$ which hold the web members and cap strips together. This beam construction lends itself admirably to wing fitting mountings where the pintle is vertical. As shown in the drawings, mountings 37 of this type may be positioned upon the outer sides of the reinforcing channels 35 and secured thereto by rivets 38.

In Figures 18 and 19 interwing struts are illustrated, comprising tubular metal posts 39. In order to provide a streamline section for the struts and to reinforce them as well, I prefer to add a nose portion 40 in each case and trailing portions 41 and 43, all of the parts 40, 41 and 43 being composed preferably of cellular rubber reinforced by enclosing the entire strut with an envelope of fabric 42.

Figure 20 illustrates a strut which is formed from a strip of my cellular reinforced rubber structural material by a simple and novel method. The strip is first trimmed on one side along both of its edges in a manner, such that when the edges are brought together the desired contour will be obtained for the rear edge of the strut. In the drawing this is accomplished by beveling both edges equally. The strip is then heated, at least along its center line, so as to enable the operator to bend it into the form illustrated, that is, with the beveled edges in intimate face to face relation. Thereafter rivets 49 are set, or some other means for holding the edges together is employed. It may be possible in some cases, particularly where my structural material is relatively thin, to accomplish the bending without the heating step, but with a cellular rubber web member of the thickness required for struts the heating step appears to be essential for the preservation of the structure of the web material.

In Figure 21 is shown a strut 45 of sheet metal formed to stream line section, which is filled with cellular hard rubber 46 as a reinforcement to materially increase its inherent beam characteristics without a corresponding increase in weight.

The strut of Figure 22, on the other hand, comprises two portions 47 of cellular hard rubber supported by a metallic plate reinforcement 48, the whole being surrounded by an envelope 42 of fabric.

In Figure 23 I have illustrated on an exaggerated scale, a small section of metal coated on both sides with vulcanized rubber to keep out moisture and afford protection against oxidation by the atmosphere. This is accomplished preferably by vulcanizing the rubber after it is in place upon the metal, so that the process of vulcanization causes the rubber to adhere to the metal. While this method of treating metal for use in airplane work forms no part of my present invention, it is nevertheless a highly desirable treatment, and I prefer to employ it on all metal parts, but particularly upon those which are exposed.

Figures 25 and 26 illustrate a modified form of wing rib, which may be substituted, for instance, for the ribs 2 of Figure 1. All of the parts excepting the rivets are to be formed of my reinforced cellular hard rubber structural material. The construction comprises upper and lower chord members having central webs 51 with reinforcing strips 25'. Pairs of vertical and diagonal struts 54 and 55 are mounted in the rib, being secured at their ends to opposite sides of the web members 51 by suitable means and being bowed outwardly at the middle where they are held by rivets or the like 53 extending through tubular spacers 52.

Having thus described my invention, what I claim is:

1. In an airplane wing, structural members built up chiefly of cellular reinforced rubber, and a nose cover of cellular reinforced rubber in sheet form bent to conform to the nose of the wing.

2. An airplane wing comprising wing beams and wing ribs secured together, and a nose cover enclosing and joining the forward ends of said ribs, said cover consisting of hard cellular reinforced rubber in sheet form.

3. In a built up structural member for airplanes, a web comprising dual-face reinforced cellular hard rubber, and cap strips, also comprising reinforced sheet rubber, rigidly connected in side to side relation to said web member.

4. In a built up structural member for airplanes, a box beam including a pair of side web members of reinforced cellular rubber in sheet form, and cap strips also comprising reinforced cellular rubber rigidly connected with said side web members.

5. In a built up structural member for airplanes, a box beam including a pair of side web members of reinforced cellular rubber in sheet form, cap strips also comprising reinforced cellular rubber rigidly connected with said side web members, and metal reinforcing members connected with said cap strips.

6. In a built up structural member for airplanes, a box beam including a pair of side web members of reinforced cellular rubber in sheet form, cap strips also comprising reinforced cellular rubber rigidly connected with said side web members, metal reinforcing members in said cap strips, parallel to said web members and in the median plane of the beam, and a fitting comprising a plate portion mounted in one end of the beam in the same plane as said metal reinforcing members, and secured to the same by splice plates.

7. In a built up structural member for airplanes, a box beam including a pair of side web members of reinforced cellular rubber in sheet form, cap strips also comprised of reinforced cellular rubber rigidly connected with said side web members, and metallic reinforcing members of channel shape enclosing said cap strips.

8. A method of forming an airplane wing strut of conventional streamline section from a strip of flat reinforced cellular hard rubber, comprising beveling the edges of the strip on one side of the latter, heating the strip substantially along its center line, bending the strip substantially along its center line to bring said beveled edges into juxtaposition, and applying means to hold the strip in said bent condition.

9. In a built up structural member for airplanes, a box beam including a pair of side web members of reinforced cellular rubber in sheet form, cap strips also comprising reinforced cellular rubber rigidly connected with said side web members, metallic reinforcing members located between said cap strips and web members, said reinforcing members having inward off-sets therein, fittings having frame portions extending into said beam in the spaces provided by said offsets, and fastenings extending through said web members, cap strips, reinforcing members and fittings.

10. In a built up structural member for airplanes, a box beam including a pair of side web members of reinforced cellular rubber in sheet form, cap strips each comprising reinforced cellular rubber rigidly connected with said side web members, metallic reinforcing members of channel shape enclosing said cap strips, and metallic fittings secured to said channel shaped reinforcing members.

11. In a built up structural member for airplanes, a box beam including a pair of side web members of reinforced cellular rubber in sheet form, cap strips each comprising reinforced cellular rubber rigidly connected with said side web members, metallic reinforcing members of channel shape enclosing said cap strips, and a metallic fitting secured to one of said channel shaped reinforcing members and extending longitudinally beyond one end of the beam.

12. An airplane wing in which the exterior surfacings are built up largely of dual-face-reinforced non-hygroscopic cellular hard rubber structural sheets possessing a high strength-weight ratio.

13. An airplane wing comprising built up structural members in which the units comprising the members are fabricated from dual-face-reinforced non-hygroscopic cellular hard rubber structural sheets possessing a high strength-weight ratio.

In testimony whereof, I hereunto affix my signature.

CHARLES A. VAN DUSEN.